March 3, 1970 R. S. ROBINSON Re. 26,806
TWO-WHEELED UTILITY TRAILERS FOR CYCLES AND HITCHES THEREFOR
Original Filed Feb. 23, 1965
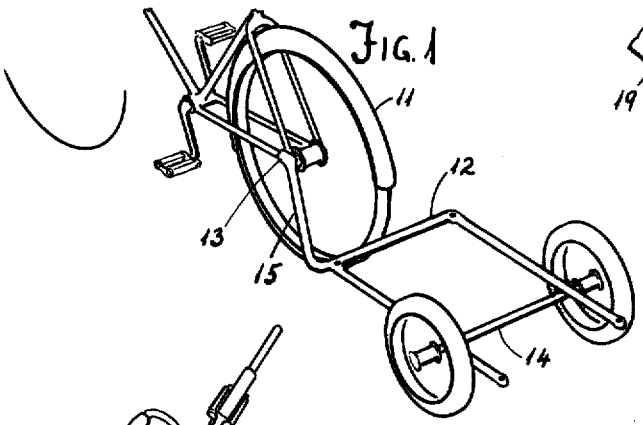
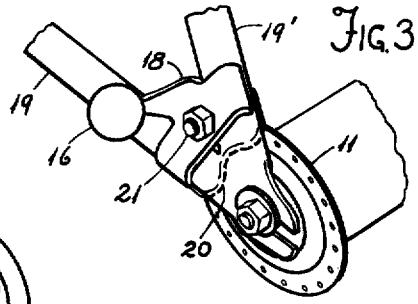
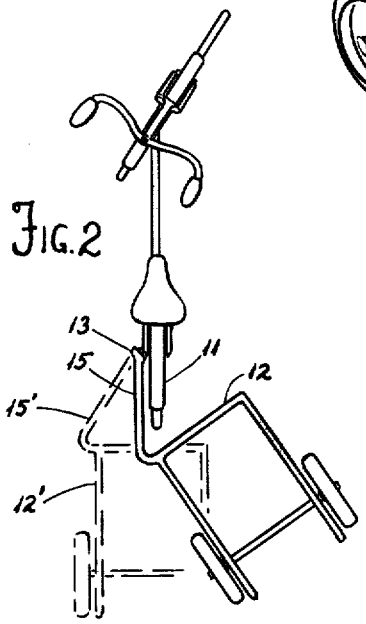
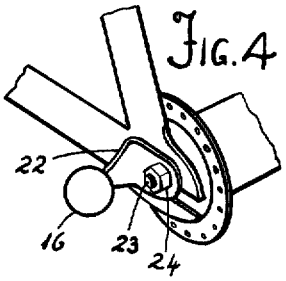
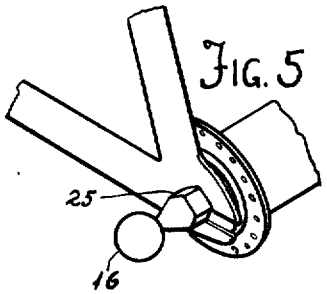
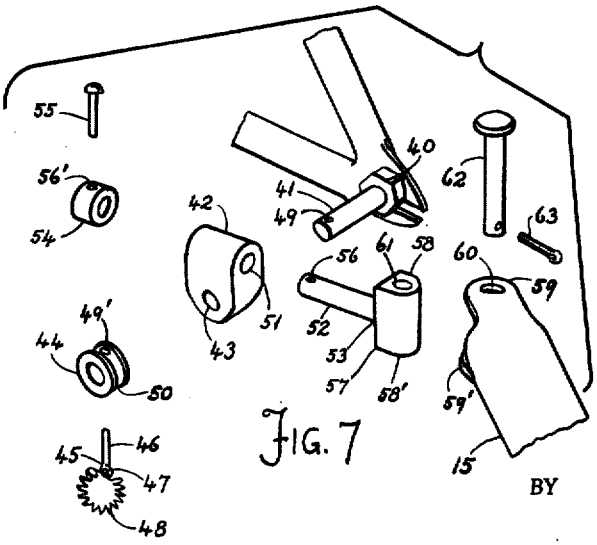
FIG. 7
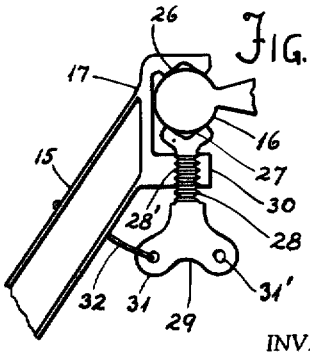
INVENTOR
Russell S. Robinson
BY United States Patent Office Re. 26,806
Reissued Mar. 3, 1970

26,806

TWO-WHEELED UTILITY TRAILERS FOR CYCLES AND HITCHES THEREFOR

Russell S. Robinson, 277 Main St.,
Farmington, Conn. 06032

Original No. 3,347,559, dated Oct. 17, 1967, Ser. No. 434,267, Feb. 23, 1965. Application for reissue Mar. 18, 1969, Ser. No. 817,226
Int. Cl. B62k *27/02, 27/12*
U.S. Cl. 280—204 5 Claims

Matter enclosed in heavy brackets [ ] appears in the original patent but forms no part of this reissue specification; matter printed in italics indicates the additions made by reissue.

*ABSTRACT OF THE DISCLOSURE*

*A two-wheeled utility trailer for towing behind a cycle includes a forwardly extending hitch tongue passing to one side of the rear wheel of the cycle. A quickly disconnectable and reconnectable means for connecting the hitch tongue to the cycle is located near the axle of the rear cycle wheel and provides universal movement of the hitch tongue relative to the cycle about turn, pitch and roll axes, the connecting means including two trunnions pivotally received respectively in two openings of a single block member.*

*DESCRIPTION OF THE INVENTION*

This invention relates to cycle trailers *and hitches,* and more particularly to trailers having two laterally-disposed wheels for connecting to cycles having two longitudinally-disposed wheels *and to hitches therefor.*

Cycles are usually used for sport and for short range personal transport. Limited utility, such as carriage of books and light cargo can be achieved by use of fixed book racks or by handlebar bins of known construction. The volume and weight of cargo which can be carried by such means is limited, however, owing to limitations in space and the fact that the rider has to balance the cargo as well as the cycle and himself during operation.

Use of a two-wheeled utility trailer which is connected to and towed behind the cycle greatly increases the volume and weight of cargo which can be carried and vastly enhances the general utility of the cycle.

It is very desirable, however, that the type of hitch used does not impair or limit the comfort and safety of the cycle, and that the hitch be connected to the lowest practical point of the cycle structure in order to enable the cyclist to perform all normal maneuvers, including banked turns and the like with minimum influence on the rider's control of the cycle. Furthermore, it is highly desirable that the trailer be quickly removable from and replaceable on the cycle, and the element of the hitch which is permanently connected to the cycle can be conveniently and inexpensively applied to all makes and sizes of cycles. Said permanent element of the hitch should also be of a form which does not detract from the appearance, weight or operation of the cycle when the trailer is removed.

In trailers according to this invention all the desirable features described above are realized. Said trailers are connected to the cycle via a universal type connector which provides freedom for banked turns and all other maneuvers. Said connector furthermore may be connected near the lowest point of the permanent structure of the cycle so that there is a minimum of pull-over during turns and a minimum of inertia effects which the rider might feel during accelerated and braked turns. By disposing the connecting means of the trailer on one side only of the cycle, the element of the hitch which is permanently connected to the cycle is simple and unobstrusive and is immediately applicable to all makes and sizes of cycles without modification to the latter. Also trailers according to the invention can be quickly removed and replaced without tools.

Other objects and features of the invention will become apparent from a reading of the specification taken with the drawing in which:

FIG. 1 is a view in perspective of the rear end of a cycle with a trailer according to the invention connected thereto. For the sake of simplicity the trailer is shown without a body.

FIG. 2 shows a plan view of a cycle, with trailer connected, in the attitude of turning sharply to the right, the broken lines showing the arrangement of the trailer when cycle is moving straight ahead.

FIG. 3 shows a view in perspective of one form of trailer hitch in which the element of the connector which is permanently connected to the cycle is clamped to members of the permanent structure on one side of the cycle.

FIG. 4 shows a view in perspective of another form of hitch in which the permanent element of the connector is rigidly connected to one end of the rear axle of the cycle by the axle nut.

FIG. 5 shows a view in perspective of still another form of hitch connector in which the element permanently connected to the cycle is embodied in a modified axle nut which replaces the original rear axle nut.

FIG. 6 is a section through a substantially horizontal plane showing one form of articulating connecting means having a quickly removable socket component.

FIG. 7 shows an exploded view in perspective of the components comprising a quickly removable universal type connector.

Referring now to the drawings, there is illustrated in the perspective view of FIG. 1 the rear portion only of a cycle 11 which is connected to a two-wheeled trailer chassis 12 by an articulating connecting means 13. Trailer chassis 12 comprises a frame 14, *and* a hitch tube *or tongue* 15 which is rigidly connected to the forward end of said frame by welding (not shown), said hitch tube being disposed on one side only of said trailer. Referring to FIG. 2, hitch tube 15 is further disposed at an angle with respect to chassis 12 in such manner that when cycle 11 is turned in the direction opposite to the side on which hitch tube 15 is disposed, said hitch tube will not contact the rear wheel, its fender or any other usual structure of cycle 11. In normal movement in a forward direction, trailer chassis 12' tracks longitudinally behind cycle 11, as shown in the broken lines of FIG. 2, hitch tube 15' then being disposed at an angle as shown by the said broken lines.

The articulation means 13 may comprise a ball-and-socket assembly or other well known universal type connector of such construction as will provide sufficient freedom of movement in the three axes, namely pitch [yaw], *turn* and roll, in order to permit the desired measure of maneuverability to the cycle.

When a ball-and-socket connector is used as an articulating connecting means 13, either the ball or the socket component according to the invention may be rigidly connected to the main structure disposed on one side of the cycle, as shown in FIGS. 1 and 2. In the examples according to FIGS. 3, 4, 5, and 6, the ball element 16 is depicted as rigidly connected to said structure, and socket element 17 is connected to hitch tube 15. In the FIG. 3 example, for instance, ball element 16 is rigidly connected by brazing (not shown) to a bracket 18 which is positioned against primary members 19, 19' which are disposed on one side of cycle 11. A clamp 20, shown in dotted lines in FIG. 3, is disposed on the opposite side of said members and is firmly bolted to bracket 18 by means of a bolt-and-nut 21 which passes through aligning holes (not shown) in bracket 18 and clamp 20.

In an alternate form according to FIG. 4, the ball element 16 is rigidly connected by welding (not shown) to an angle plate 22 which is provided with a hole (not shown) of sufficient diameter to receive the rear axle 23 of cycle 11. The original axle nut 24, which threadedly engages rear axle 23 is then replaced and tightened in such manner as to rigidly connect plate 22 to cycle 11. In a further construction form, as shown in FIG. 5, ball element 16 is formed as a homogeneous extension to a special nut 25 which is threadedly interchangeable with axle nut 24 of FIG. [24] *4*. According to this form, axle nut 24 is removed and replaced by a special nut 25 which is screwed home on axle 23 of FIG. 4 in such manner as to ensure that ball element 16 is rigidly positioned with respect to cycle 11.

FIG. 6 shows a horizontal cross section of a simple form of quick disconnect socket element of the articulating means 13. According to FIG. 6, ball element 16 is slidably enclosed within a socket 17 which is weldedly connected to hitch tube 15 at an angle which substantially equals the angle of hitch tube 15' with respect to the plane of the wheels of trailer chassis 12, as shown in FIG. 2. Socket 17 is provided with an internal concave cone 26, the outer surface of which is substantially tangential with the ring of contact of said cone with respect to ball element 16. Substantially coaxial with cone 26 and on the opposite side of ball element 16 is a similar cone 27 which is formed on one end of a threaded shaft 28. A wingnut 29 is rigidly connected by any of a number of well known means (not shown) to the opposite end of said shaft. Shaft 28 is threadedly accommodated within a threaded hole being formed in a lug 30 of socket 17. Holes 31, 31' are found in the opposite wings of wingnut 29, one of which accommodates a wire 32 which is disposed around hitch tube 15 in well known manner in order to prevent the unwinding of threaded shaft 28 and the loosening of enclosure of socket element 17 with respect to ball element 16. It will be understood that any of a number of toggle, eccentric or other past-dead-center devices of well known construction may be employed according to the invention to actuate and lock cone 27 in lieu of the threaded screw form of lock and release shown in FIG. 6.

[The universal type connector of articulating connecting means] *Another form of universal articulating means* 13 is exemplified in FIG. 7, in which the components of said means are shown in exploded arrangement for the sake of clarity. According to this example, a special hub nut 40 is formed with a coaxial trunnion 41 *extending generally outwardly relative to the cycle.* A block 42 is provided with a hole 43 which is slidably disposed over trunnion 41 [and is retained thereon] *to permit pivotal movement of the block 42 relative to the trunnion 41 about a pitch axis which is the axis of the trunnion 41, the trunnion 41 and hole 43 extending generally horizontally and transversely of the cycle when the cycle is in its normal attitude as in FIG. 1. The block 42 is retained on the trunnion 41* by means of a collar 44 which is positively locked to trunnion 41 by a quick release [pin 45. Pin 45] *device 45. Said device 45 according to the present example* comprises a shear pin 46, one end of which is provided with a transverse hole 46 in which the end loops of a tension spring 48 are permanently disposed. When shear pin 46 is fitted into coaxial holes 49, 49' formed in trunnion 41 and collar 44 respectively, spring 48 is stretched over collar 44 and seated in a groove 50 which is formed around the outer surface of collar 44, thereby retaining shear pin 46 and preventing the escape of quick release pin 45 from holes 49, 49'.

Also formed in block 42 is a hole 51 which lies in the substantially longitudinal plane in such manner as not to intersect hole 43. Hole 51 slidably accommodates the shaft [52 of a pintle 53, said shaft being retained in said hole] *of trunnion 52 of a pintle 53 to permit pivotal movement of the trunnion 52 relative to the block 42 about a roll axis which is the axis of the trunnion 52, the trunnion 52 and hole 51 extending generally horizontally and longitudinally of the cycle when the trailer is in its normal attitude relative to the cycle as in FIG. 1. The trunnion 52 is retained in the hole 51 by* a ring 54 which is locked in position on shaft or second trunnion 52 by a rivet 55 which is permanently disposed in holes 56, 56' formed in shaft 52 and ring 54 respectively. A head 57 is formed in the opposite end of pintle 53, said head having upper and lower surfaces 58, 58' which are slidably accommodated within forks 59, 59' which are weldedly connected to hitch tube *or tongue* 15. Substantially vertical holes 60 are formed in forks 59, 59' which are coaxial with a hole 61 of similar diameter which is formed in head 57 of pintle 53, and a clevis pin 62 is disposed in holes 60, 61 [which is locked against escape therefrom] *to pivotally connect the head 57 to the tongue forks 59, 59' to allow the tongue 15 to pivot relative to the head 57 about a turn axis which is the axis of the pin 62, the pin 62 being generally vertical when the trailer is in its normal attitude relative to the cycle as in FIG. 1. The pin 62 is locked against escape from the forks 59, 59' and head 57* by a split pin 63.

I claim:

1. In a system for towing a trailer behind a cycle,
a hitch for connecting said trailer to said cycle,
said hitch having a rear and attached to said trailer, and said hitch having laterally displaced forward end attached to one side of said cycle,
said forward end including articulated connecting means connecting said hitch to said cycle for allowing freedom of movement of said cycle with respect to said trailer about [at least elevation] *pitch, roll* and turn axes,
said articulated connecting means including a first trunnion rigidly connected to said cycle and laterally extending thereof,
a block having one hole slidably disposed on said first trunion for movement about said [elevation] *pitch* axis,
a second trunnion pivotally attached to said trailer *for movement about said turn axis,*
said block having a second hole slidably disposed on said second trunion for movement about said [turn] *roll* axis.

2. The system recited in claim 1 wherein is included a collar, *and*
a release [pin] *device* for locking said collar to said first trunnion.

3. *In a system for towing a trailer behind a cycle,*
*a hitch for connecting said trailer to said cycle,*
*said hitch having a rear end attachment to said trailer, and said hitch having a laterally displaced forward end attached to one side of said cycle,*
*said forward end including articulated connecting means connecting said hitch to said cycle for allowing freedom of movement of said cycle with respect to said trailer about pitch, roll and turn axes,*
*said articulated connecting means including a first trunnion rigidly connected to said cycle and extending generally outwardly thereof,*
*a first member having a hole slidably disposed on said first trunnion for movement about said pitch axis,*
*a second member,*
*means pivotally connecting said forward end of said hitch to said second member for movement about one of said turn and roll axes.*
*and means pivotally connecting said second member to said first member for movement about the other of said turn and roll axes.*

*4. The combination defined in claim 3 further characterized by said means pivotally connecting said first member to said second member including a hole in one of said first and second members and a trunnion on the other of said members slidably received in said latter hole.*

*5. The combination defined in claim 4 further characterized by said last-mentioned hole being formed in said first member and said last-mentioned trunnion being part of said second member.*

References Cited

The following references cited by the Examiner, are of record in the patented file of this patent or the original patent.

FOREIGN PATENTS

| | | |
|---|---|---|
| 1,073 | 1891 | Great Britain. |
| 241,131 | 6/1946 | Switzerland. |
| 867,284 | 7/1941 | France. |
| 867,751 | 9/1941 | France. |
| 906,620 | 5/1945 | France. |
| 980,513 | 12/1950 | France. |
| 1,061,663 | 12/1953 | France. |
| 1,075,252 | 4/1954 | France. |

LEO FRIAGLIA, Primary Examiner

U.S. Cl. X. R.X.

280—494

PO-1050
(5/69)

UNITED STATES PATENT OFFICE
CERTIFICATE OF CORRECTION

Patent No. Re. 26,806 Dated March 3, 1970

Inventor(s) Russell S. Robinson

It is certified that error appears in the above-identified patent and that said Letters Patent are hereby corrected as shown below:

Col. 3, line 37, after "hole" insert -- 28' which is coaxial with cone 26, said threaded hole --; line 38, "found" should read -- formed --.

Col. 4, line 4, "of" first occurrence, should read -- or --; line 10, "by" should not be italicized; line 32, "and" should read -- end --; line 57, "attachment" should read -- attached --.

Signed and sealed this 4th day of August 1970.

(SEAL)
Attest:

EDWARD M. FLETCHER, JR.
Attesting Officer

WILLIAM E. SCHUYLER, JR.
Commissioner of Patents